Sept. 26, 1933.   G. SCHAPER   1,928,504
COOLED NOZZLE SEGMENT FOR COMBUSTION GAS TURBINES
Filed Jan. 4, 1933
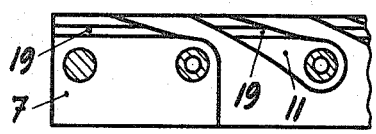
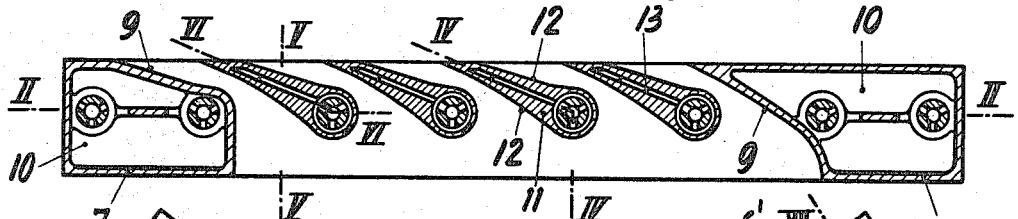
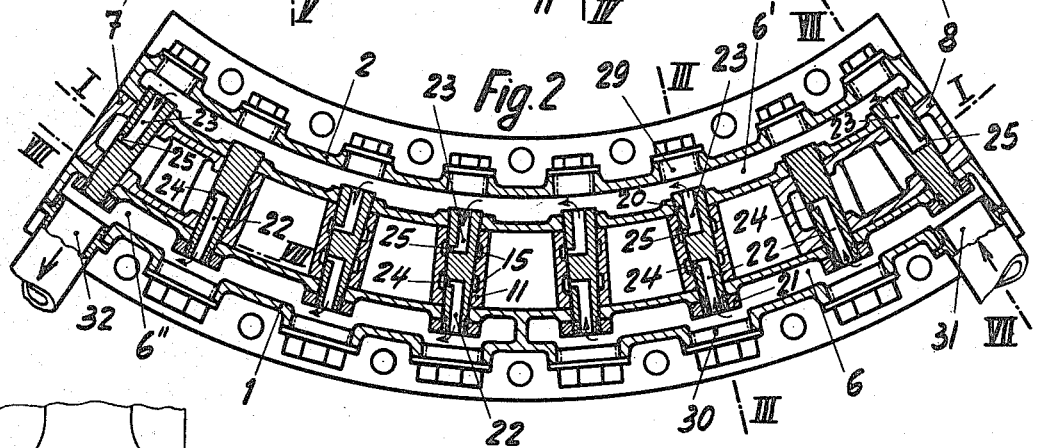
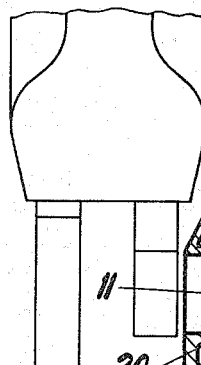
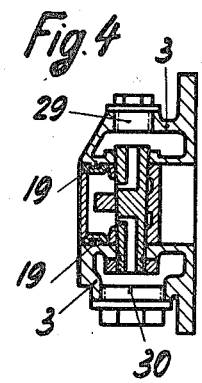
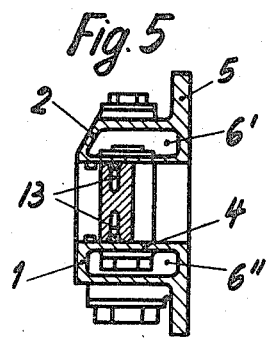
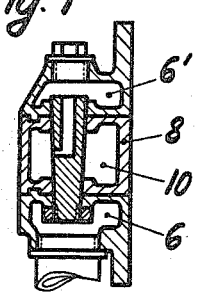
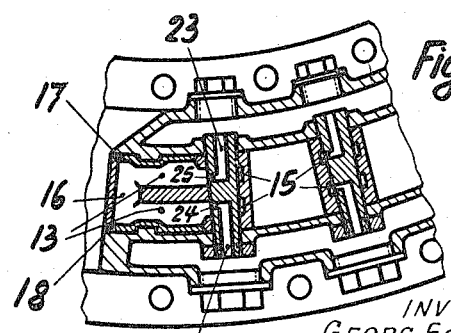
INVENTOR
GEORG SCHAPER
BY
ATTORNEY Patented Sept. 26, 1933

1,928,504

UNITED STATES PATENT OFFICE 1,928,504

COOLED NOZZLE SEGMENT FOR COMBUSTION GAS TURBINES

Georg Schaper, Mulheim-Ruhr-Broich, Germany, assignor to Holzwarth Gas Turbine Co., San Francisco, Calif., a corporation of Delaware Application January 4, 1933, Serial No. 650,071, and in Germany January 9, 1932

8 Claims. (Cl. 60—41)

The present invention relates to the structure of the nozzles which direct the hot gases, such as come from the constant volume explosion chambers of an explosion gas turbine, to the blades of the gas turbine, and has for its object to provide a nozzle segment construction which can be efficiently cooled at all parts thereof subjected to the high heat of the gases and whose gas-contacted surfaces can be properly finished without difficulty, and which at the same time is simple in construction, inexpensive to manufacture, and proof against leakage at all operating temperatures.

It has already been proposed to provide cooled nozzle segments for gas turbines which are composed of individual parts which, after manufacture with a view to constancy of dimensions, leak-proofness, strength, and proper surface characteristics, are assembled together to form the complete nozzle segment. This mode of manufacture offered the advantage, in contrast with cast or composite nozzle arrangements produced by welding together of individual parts, regardless of whether the structure embraced only one nozzle or a plurality of nozzles, that the smoothness of the gas contacted surfaces, produced during the manufacture of the individual parts, is retained after such parts have been assembled, so that the friction losses suffered by the high velocity gases passing through the nozzles are greatly reduced. In the case of a nozzle segment made of a single cast member, the finishing of the inner wall surfaces to the greatest possible smoothness is extremely diffcult, if not entirely impossible. With nozzle segments made up of individual parts which are welded together, those parts which are contacted by the gases can indeed be smoothed down before the welding, but such parts suffer considerably by the subsequent welding, while a subsequent repeated smoothing of the surfaces is just as difficult, if not as impossible, as in the case of single piece, cast nozzles. Of particular difficulty is the sealing of shrinking holes, pores or fissures such as always occur with complicated castings; from this standpoint, also, nozzle segments made by assembling finished individual parts offer the greatest advantages.

Whereas known devices attempt to cool only the nozzle vanes, but not the framework within which the vanes are positioned, and thereby solve only a comparatively simple problem, the present invention proceeds from the recognition of the fact that the cooling of such framework, which includes top and bottom members between which the nozzle vanes are fixed is indispensable, and provides a simple, efficient and reliable construction whereby both the vanes and the parts to which they are attached are adequately cooled.

According to the present invention there is provided a nozzle segment construction composed of parts which, after their manufacture wherein they are given the requisite constancy of dimensions, tightness, strength and surface constitution, are assembled to form the finished nozzle segment, wherein the top and bottom members between which the cooled nozzle vanes are located, are likewise cooled, the cooling spaces of the nozzle vanes and of the such members communicating with each other, preferably through bores in bolts which fasten the parts together.

In a further development of the invention, the nozzle segment is closed at both ends by end pieces which likewise are provided with cooling chambers, the cooling spaces of the end and top and bottom members being in communication preferably through the bolts which clamp the parts together.

Whereas heretofore the cooling of the discharge ends of the nozzle vanes presented the greatest difficulties because the bores for the cooling agent could not be made to penetrate sufficiently near to the ends of the vanes, the present invention effects cooling of the ends of the nozzle vanes in a highly advantageous manner by channeling the nozzle vanes longitudinally thereof and connecting two such channels in each vane by a cross channel lying in the end portion of the vane, the longitudinal channels being connected with admission and discharge ports for cooling agent in the bolts which fasten the parts together, the cooling agent passing to and from such channels through annular grooves in the nozzle vanes communicating with such ports. The nozzle vane channels can be sealed by soldering or welding.

In the preferred embodiment of the invention the clamping bolts for the nozzle vanes are bored at both ends for conveying the cooling agent to and from the nozzle vane, while the clamping bolts for the end pieces are bored only at one end, so that by suitable displacement of the bores all of the cooling surfaces of the end pieces can be swept with cooling agent to the same degree as is obtained in the nozzle vanes by the directed movement of the cooling agent.

If the cooling spaces of the top and bottom members are subdivided into two or more parts, then instead of conducting parallel streams of cooling agent through the several vanes, certain of the parallel streams can be made to traverse other vanes in series, thereby producing a series-parallel flow, so that the possibility is presented of partially equalizing unusually large temperature differences by the use of series streams of cooling agent.

The top and bottom members and the nozzle vanes are preferably provided with interlocking shoulders and recesses or similar interfitting means, which together with the clamping bolts take up the static and dynamic pressure exerted upon the nozzle vanes by the combustion or explosion gases.

A satisfactory embodiment of the invention is illustrated by way of example on the accompanying drawing, wherein Fig. 1 is a section along the line I—I of Fig. 2 developed in the plane of the sheet of drawing;

Fig. 2 shows a vertical section through the nozzle segment along the line II—II of Fig. 1;

Fig. 3 is a transverse vertical section through the nozzle segment along the line III—III of Fig. 2;

Fig. 4 is a section through a nozzle vane along the line IV—IV of Fig. 1;

Fig. 5 illustrates a vertical section through the nozzle segment along line V—V of Fig. 1;

Fig. 6 is a vertical longitudinal section through a nozzle vane indicated by the line VI—VI of Fig. 1; and Figs. 7 and 8 are sections through the lines VII—VII and VIII—VIII respectively, of Fig. 2.

The nozzle assembly illustrated on the drawing includes the jacketed bottom and top members 1 and 2 whose inner gas-swept walls have been carefully smoothed down. A flange 5 serves for attachment of the members 1 and 2 to the turbine frame, and especially to the nozzle valve ring of an explosion turbine. The spaces 6 within the jacketed members 1 and 2 are traversed by a cooling medium which enters at 31 and leaves at 32.

Between the ends of the members 1 and 2 are located hollow end pieces 7 and 8 which are similarly smoothly formed upon their gas-contacted surfaces 9 and are made hollow to receive a cooling agent.

Between the members 1 and 2 and between the end pieces 7 and 8 are positioned a number of nozzle vanes 11 having smooth surfaces 12 which are struck by the gases and direct the latter to the turbine rotor (a fragment of which is shown in Fig. 3). Two spaced channels 13 (Figs. 1 and 6) are provided in the vanes 11, the channels in each vane being connected by a cross-channel 16 at the discharging end of the vane. Bores 14 at the thickened inlet ends of the vanes receive hollow anchoring bolts 20, which may be tapered, as shown. Annular grooves 15 within the walls of the bores 14 communicate through ports 24, 25 with axial bores 22, 23 in the bolts 20. The grooves 15 afford passage for the cooling agent to and from the channels 13, which, together with the cross-channels 16, are sealed by soldered or welded joints 17 and 18. As the slotted channels can be given any desired depth, the nozzle vane 11 can have any desired height without interfering with the cooling thereof. The mode of cooling proposed by the present invention is therefore particularly advantageous for nozzles of large height, that is, for turbines of large capacity. The cross-channels 16 at the ends of the nozzle vanes lead the cooling agent to the extreme ends of such vanes, that is, to the places which, in known arrangement, as experience has shown, are inadequately cooled.

At the top and bottom surfaces of the nozzle vanes which engage the top and bottom members 1 and 2, there are located recesses in the region of the vane ends, which recesses receive corresponding shoulders 19 on the members 1 and 2 (see Figs. 4 and 8). By these means the nozzle vanes are held fixed in position, such means together with the anchoring bolts taking up the static and dynamic pressure of the combustion gases.

The bolts 20 with their centrally bored nuts 21 hold the top and bottom members 1 and 2, the end pieces 7 and 8 and the nozzle vanes 11, fixed in assembled condition. The bolts 20 and nuts 21 are inserted through holes 29 and 30 in the outer wall 3 of the top and bottom members, the holes being sealed by means of threaded plugs after the parts have been assembled.

The cooling agent flows through the parts of the nozzle segment in the following order. It enters at 31 into the space 6 of the bottom member 1, flows through half the number of bolts and nozzle vanes, which communicate with the space 6 through the bores 22 and ports 24 in the bolts 20, then flows through the annular grooves 15 in the lower longitudinal channels 13 in the nozzle vanes then traverses the cross-channels 16, the upper longitudinal channels 13 and the annular grooves 15, then through ports 25 and bores 23 of bolts 20 into the space 6' of the upper member 2. The cooling agent then flows in the reverse direction through the other half of the total number of bolts 20 and through the nozzle vanes 11 to the space 6'' in the lower member 1, and finally into the discharge port 32. It will be noted that the spaces or chambers 6 and 6'' are separated by a central rib.

A parallel current of cooling agent flows through the end pieces 7 and 8. The bolts 20 which clamp the end and top and bottom parts together and pass through the end pieces do not have the same number of bores as the bolts which pass through the nozzle vanes. The bolts 20 penetrating the end pieces and lying nearest to the nozzle vanes have only the bores 22 and ports 24; the bolts lying at the outer end of the end pieces, on the other hand, have only the bores 23 and ports 25. The stream of cooling agent thus flows from the space 6 of the bottom member 1 through the bore 22 and port 24 of the left-hand bolt 20 (Fig. 2) in the end piece 8, into the interior of such end piece 8, and through the port 25 and bore 23 of the bolt 20 lying at the right-end of the piece 8 into the space 6' of the top member 2, whence it flows through the bore 23 and port 25 of the bolt 20 lying at the extreme left-hand end of the end piece 7, into whose interior 10 the cooling agent then flows. The cooling agent escapes through the port 24 and bore 22 of the bolt 20 at the inner end of the end piece 7 and passes into the space 6'' of the bottom member 1 from which it flows off with the parallel stream of cooling agent from the nozzle vanes through the discharge port 32.

The bolts 20 are shown on the drawing in the form of tapered bolts which are so seated in liquid tight manner in suitably reamed holes in the members 1 and 2, the end pieces 7 and 8, and likewise in the nozzle vanes 11, that they not only connect the parts in which they are seated into a rigid structure, but also prevent escape of the cooling agent to the exterior. In place of the nut 21 the bolts may be provided with rivet heads; in such case it would of course not be possible to disassemble the structure without injuring the rivet bolts.

It has already been mentioned that the channels 13 and the cross-channels 16 in the nozzle vanes 11 must be closed by soldering or welding. A solder seam is necessary when the nozzle vanes and bolts are made of tool steel with a high limit of stretching strain, because such material cannot be welded. In such case the slot is closed either by hard solder or by copper welding in a hydrogen atmosphere. The manufacture of the nozzle vanes and the bolts out of a metal having a high limit of stretching strain offers the advantage that the bolts can be given a high initial tension with reference to the nozzle vanes, which tension is not reduced to zero even with considerable difference in the coefficient of heat expansion between the vane and the bolt. In this way leakage between the bolt and the vane as a result of differences in expansion between the two is eliminated.

The nozzle vanes 11 may be made in the following manner. A rough forged annular block of such a length that all the nozzle vanes of a segment, in the present case four, can be made therefrom, is first turned down to the desired inner and outer diameter and to its proper height. The holding groove located at the end of the nozzle vanes is made at the same time. After drawing the nozzle vane outlines upon both sides of the block, the holes for receiving the anchoring bolts are drilled; the cooling channels are then formed by slotting and the connection therebetween by the cross channeling is produced. The cooling channels are then closed above and below by welding or soldering and the block is then cut into the individual vanes. The several block parts are then finally milled separately to form the finished individual nozzle vanes.

The individual parts of the nozzle segments may, however, also be composed of hollow castings or can be made of separate parts which are welded together. The several parts have such simple shapes that their manufacture and the treatment of their surfaces, particularly of the gas-swept surfaces, as well as testing with respect to constancy of dimensions, tightness, and strength present no difficulties. For this reason nozzles built in the manner above-described may be cooled with a cooling agent of very high pressure.

I claim:

1. A nozzle segment for combustion gas turbines adapted to have substantially all of the gas-contacted walls thereof swept by a cooling agent, comprising jacketed top and bottom members, one or more nozzle vanes positioned between said members, said vanes being hollow for the reception of a cooling agent, a bolt passing through each of said vanes and clamping said members and vane or vanes together, each bolt being provided with a passageway for cooling agent connecting the interior of the vane with the interior of the jacketed members, said members, vanes and bolts being completely machined prior to assembly, means for conducting a cooling agent into said segment, and means for withdrawing said cooling agent therefrom.

2. A nozzle segment according to claim 1, including hollow end pieces closing the ends of the segment, and bolts arranged to connect said end pieces with the top and bottom members and provided with passageways which establish communication between the interiors of said end pieces and members.

3. A nozzle segment according to claim 1, wherein each of the nozzle vanes is provided with two longitudinal channels connected by a cross-channel at the tip of the vane, each of the bolts having separate passages for the supply and discharge of cooling agent, and said vanes having annular grooves for establishing communication between said longitudinal channels and said supply and discharge passageways.

4. A nozzle segment according to claim 1, wherein each of the nozzle vanes is provided with two longitudinal channels connected by a cross-channel at the tip of the vane, each of the bolts having separate passages for the supply and discharge of cooling agent, and said vanes having annular grooves for establishing communication between said longitudinal channels and said supply and discharge passageways, the tips of said vanes being soldered or welded to the body thereof to close the channels in said vanes.

5. A nozzle segment according to claim 1, including hollow end pieces closing the ends of the segment, and bolts passing through said end pieces and arranged to connect said end pieces with the top and bottom members, and provided each with a passageway at only one end thereof, so that each of said bolts is in communication with the interior of only one of the top and bottom members, such bolts communicating alternately with said top and bottom members, whereby the whole surface of said end pieces is contacted by a stream of cooling agent.

6. A nozzle segment according to claim 1, wherein the interior of at least one of the members is divided to provide a plurality of separate chambers.

7. A nozzle segment according to claim 1, wherein the contacting surfaces of the vanes and top and bottom members are provided with interlocking shoulders and recesses which, together with the clamping bolts, take up the static and dynamic pressure exerted on the vanes by the driving medium.

8. A nozzle segment for combustion gas turbines adapted to have substantially all of the gas-contacted walls thereof swept by a cooling agent, comprising jacketed top and bottom members, one or more nozzle vanes positioned between said members, said vanes being hollow and said top and bottom members being apertured in registry with said vanes to establish communication between the interiors of said members and vanes, said members and vanes being separately manufactured elements, means for clamping said members and vanes together into a rigid assembled segment, a conduit for conducting a cooling agent to said segment, and a conduit for withdrawing the cooling agent therefrom.

GEORG SCHAPER.